Dec. 5, 1944.  G. H. TUMOLILLO  2,364,570
UNDER WATER CONSTRUCTION
Filed Aug. 10, 1942   2 Sheets-Sheet 1
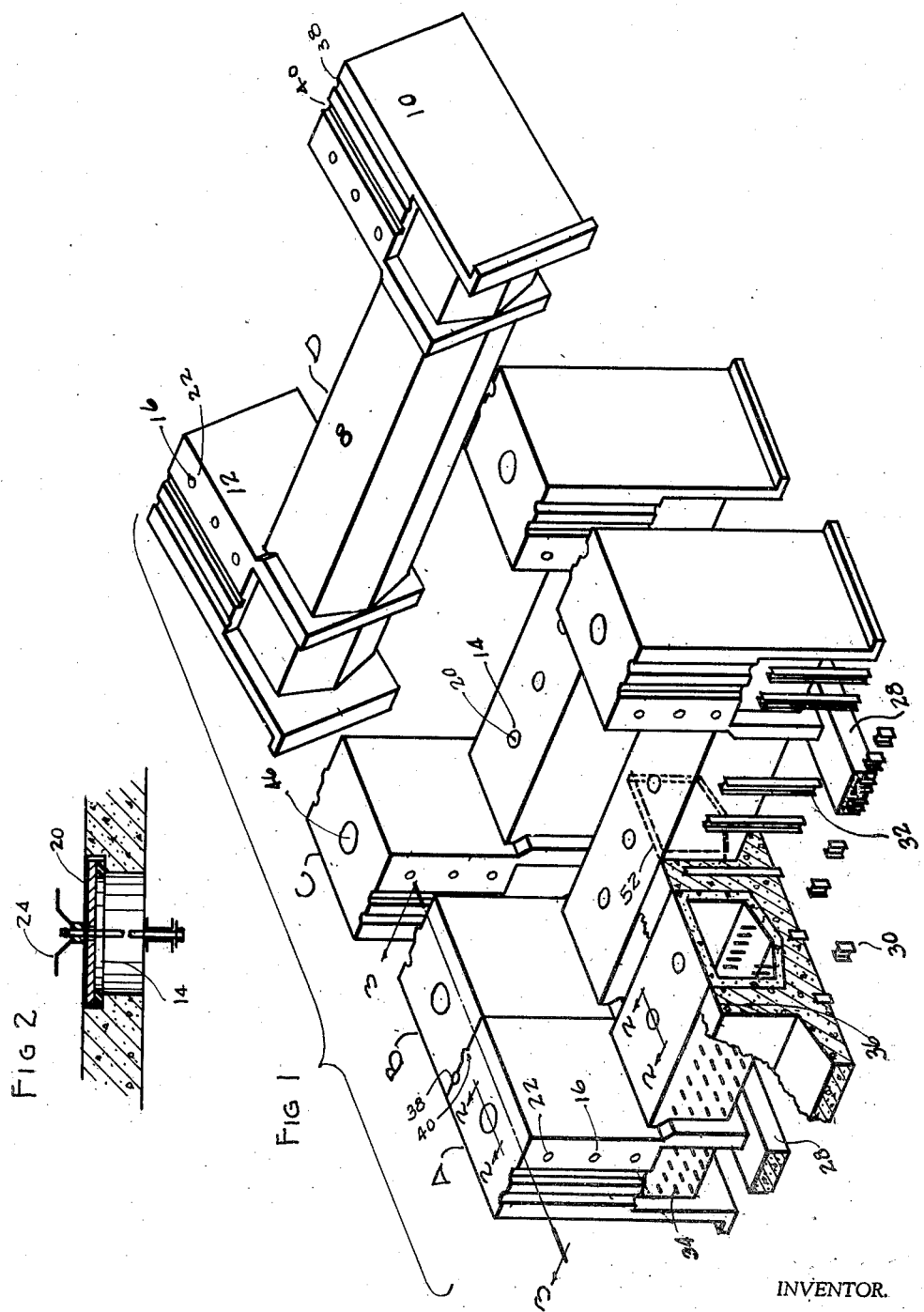
INVENTOR.
GERALD H. TUMOLILLO
BY Dec. 5, 1944. G. H. TUMOLILLO 2,364,570
UNDER WATER CONSTRUCTION
Filed Aug. 10, 1942  2 Sheets-Sheet 2
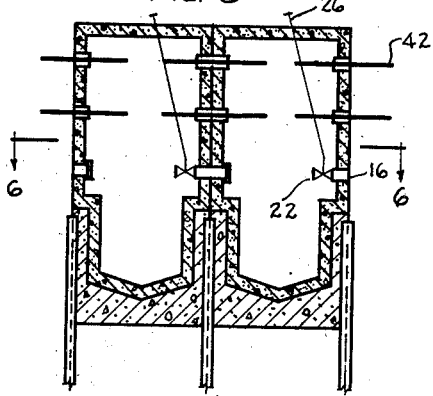
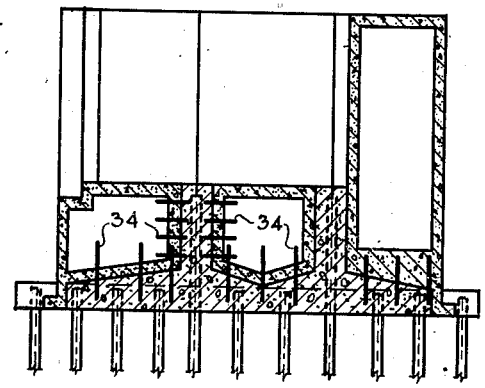
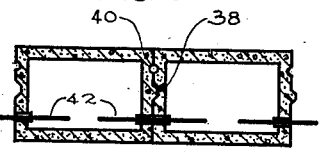
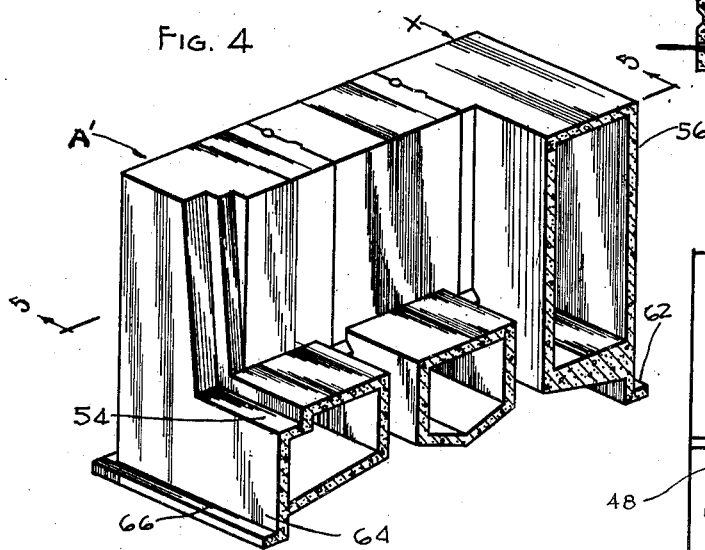
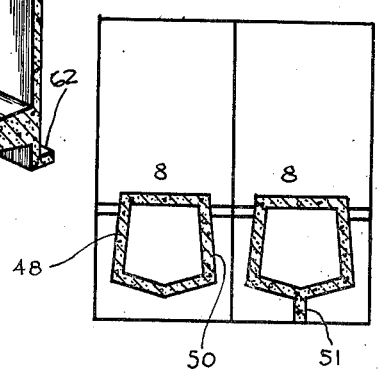
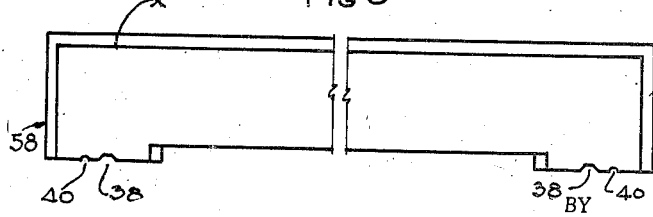
INVENTOR.
GERALD H. TUMOLILLO
BY Louis Necho Patented Dec. 5, 1944

2,364,570

UNITED STATES PATENT OFFICE 2,364,570

UNDERWATER CONSTRUCTION

Gerald H. Tumolillo, Philadelphia, Pa.

Application August 10, 1942, Serial No. 454,341

13 Claims. (Cl. 61—64)

In the building of dry docks, canals and the like of concrete, it has been the practice to utilize large caissons which are sunk to the bed of the body of water and from which the water is subsequently pumped out and the concrete poured in place. Another method is known as the "Tremie" concrete process in which a pipe is lowered close to the bed of the body of water and the concrete is poured in through the pipe. The pipe is gradually raised as the concrete is poured and the concrete is "mushroomed" around the bottom end of the pipe thus displacing the water and settling into a solid mass. The use of this method of pouring the concrete under water necessitated the use of very strong forms for retaining the concrete while it sets. Such forms had to be made of steel and the assembling of these forms under water presented many and serious difficulties. Thus both of these methods have their obvious disadvantages which need not be discussed in detail. In order to avoid these disadvantages another method was resorted to, namely, the building of the entire dry dock or the like in one piece on land and subsequently sinking and anchoring the same in the desired position. To make this construction practical the prefabricated or premolded dry dock had to be made in the form of a hollow shell and even then the weight and the bulk constituted a very serious problem in handling which again makes this method almost impractical. Furthermore, the displacement of a hollow, premolded dry dock of substantial size was such that it was difficult if not impossible securely and permanently to anchor the same against buoyancy exerted upon it by water pressure.

To overcome these difficulties I have designed a novel premolded dry dock construction which is formed in hollow units and I have provided with adequate means for sinking and permanently anchoring the assembled dry dock at a minimum of expense, labor and time.

Other novel features of construction and advantage will be more clearly understood from the following specification and the accompanying drawings in which:

Fig. 1 represents a composite, diagrammatic, perspective view illustrating the construction of the sections of my dry dock, their assembly and their anchoring.

Fig. 2 represents, on an enlarged scale, a fragmentary sectional view on line 2—2 of Fig. 1.

Fig. 3 represents, on an enlarged scale, a fragmentary sectional view on line 3—3 of Fig. 1.

Fig. 4 represents a fragmentary perspective view of a portion of the finished dry dock.

Fig. 5 represents a section on line 5—5 of Fig. 4.

Fig. 6 represents a section on line 6—6 of Fig. 3.

Fig. 7 represents a view similar to Fig. 3 showing a modified form of construction.

Fig. 8 represents a plan view of a premolded unit which constitutes the back end of a dry dock construction embodying my invention.

Referring to the drawings in which like reference characters indicate like parts, and more particularly to Fig. 1, it will be seen that my novel dry dock construction is formed of premolded units, A, B, C, D, etc., it being understood that as many of the units shown can be used as are necessary to produce the desired length. Each of the units A, B, C, D, etc., is composed of the horizontal portion 8 and the two vertical portions 10 and 12 which are integrally formed on land and which are floated (in the position of unit D) to the point of assembly. It will be noted that the vertical portions 10 and 12 and the interconnecting horizontal portion 8 are all made hollow and that they are provided with openings 14 and 16 which are provided with suitable removable closures 20 and 22. The closures 20 are provided with suitable handles 24 and the closures 22 are provided with the extension handles 26. After one of the units has been floated in the position of the unit D and has arrived at the point of assembly the unit is righted and aligned with the preceding unit and the closures 22 are opened thus flooding the hollow portions 8, 10 and 12, and thus submerging the unit into the position assumed by the units A, B or C. In this position the premolded units will rest upon the foundations 28 and pilings 30 but will be slightly spaced from the pilings 32 which rise above the bed of the body of water substantially to the height of the horizontal portion 8. The side walls and the bottom wall of the horizontal portion 8 and vertical portions 10 and 12 are provided with suitable rods 34 which extend laterally therefrom, the rods being straight or deflected in the form of hairpins or the like. With the premolded units in the upright position (as for example at A) concrete is poured by the "Tremie" process on either side of each of the horizontal and vertical portions 8, 10 and 12 so as to envelope the pilings 32 and the portions 8, 10 and 12 of the premolded unit substantially to the height of the horizontal portion 8 as at 36. It will be noted that the body of concrete thus poured engages the short and long pilings 30 and 32 as well as the binding rods 34 thus constituting a firm bond or anchorage between each of the premolded units A, B, etc., and the foundations 28 and pilings 30 and 32. Preferably beginning at the center of each of the portions 8 the closures 20 of the openings 14 in the tops of the portions 8 are removed and concrete is poured, also by the "Tremie" process, to fill the horizontal hollow portions 8. It will be noted that I have provided a plurality of openings 14 so as to insure complete filling of the interior of the hollow portions 8 and that the openings are not very far apart so as to guard against the setting of the concrete before it has had a chance to fill all the cavities. As the concrete is poured through one of the openings the water is displaced through one of the other openings and the process is continued until the hollow portions are completely filled. This is not shown in the drawings in the interests of clarity of illustration.

As will be clearly seen from Fig. 6 the vertical portions 10 and 12 are likewise hollow and are provided on their contiguous surfaces with a tongue and groove arrangement 38 which serves to guide each unit into proper alignment with the preceding one and it will also be noted that the contiguous walls of the vertical portions 10 and 12 are also provided with complementary grooves forming a vertical channel 40 into which concrete or a plastic composition may be poured to form a water-tight seal and thus prevent seepage into the dry dock after the locks are closed and the water is pumped out. Either by means of diving or by means of the extension handle 26 the closures 22 of the openings 16 are removed and interconnecting and reinforcing rods 42 are inserted in the manner best illustrated in Figs. 3 and 6 so that each of the rods 42 passes through the adjacent walls of any two contiguous portions and projects into the hollow vertical adjacent portions 10 or 12. "Tremie" concrete is then poured through the openings 46 in the tops of the vertical portions 12 and 10 to fill the same, said concrete also engaging the interconnecting rods 42 thus fastening the unit B to the unit A, the unit C to the unit B, etc.

In Fig. 7 I have illustrated a modified form of construction in which the hollow interconnecting portions 8, instead of being made substantially rectangular or with their side walls at right angles to their top walls, are made with the side walls converged as at 48 and 50 so that, when the "Tremie" concrete is poured around the portions 8 and 10 it will, when set, assume the form of a downwardly pointing wedge thus somewhat enhancing the anchoring factor. In Fig. 7 I have shown a baffle 51 which extends longitudinally from the bottom of the intermediate portions 8 and rests on the foundation or bed, the purpose of this baffle or partition being to prevent the flow of the "Tremie" concrete beyond that point. It is to be understood that while I show the baffle 51 only at one point in Fig. 7 the baffle is to be provided along the bottom of each of the intermediate portions 8 of the entire construction, it being omitted from the other figures in order to avoid confusion. Thus, with the baffle 51 extending downwardly, for instance, from the bottom of the intermediate portion 8 of the unit B, the concrete poured between the intermediate portions 8 of the units B and C will not flow past the baffle 51 in the direction of the unit A and so forth. 52 designates a partition which may be used at the center of each of the intermediate portions 8 so as to retain the concrete poured through the openings 14 on either side of said partition. Again I have shown the partition only in the intermediate portion 8 of the unit B but it is to be understood that if it is used it will be incorporated in all of the intermediate portions 8.

In Fig. 4 I have shown a greatly foreshortened one-half of a dock (longitudinally divided) built according to my invention in which the unit A' is assumed to be at the entrance end of the dock. The unit A' is provided with a sill 54 for receiving a gate or lock which is not shown as it can be conventional. Also in this view I show a rearmost unit X which forms the closed back end of the dock, the unit X being shown in plan view in Fig. 8. It will be noted that the unit X differs from the units A, B, C, etc., in that instead of having a low interconnecting intermediate portion 8 it is provided with an intermediate or interconnecting portion 56 of the same height as the vertical portions 10 and 12 of the unit X.

The operation is as follows:

Beginning at the "land end" or the point nearest to land at which the dock is to be constructed, the unit X which is provided with the same openings 14 and 16 as the other units A and B (although these openings are not shown) is floated to the desired point in the position of the unit D of Fig. 1 and is then righted, flooded and submerged in position. It will be noted that the unit X has the front extensions 58 and 60 which are provided with the grooves 38 to receive the tongues of the next adjacent unit and also with the complementary recesses 40 for receiving the sealing material. By way of further reinforcement "Tremie" concrete is poured behind the high interconnecting portion 56 and along the ledge 62 thereof if desired. Assuming the dock is to be built, only for purpose of illustration, of the units D, C, B and A shown in Fig. 1, the unit D is next floated, righted and aligned with the back unit X and is submerged so as to have the interlocking tongue and groove arrangement and water-seal arrangement shown in Fig. 6 in relation to the unit X. The process is repeated with the units C and B, etc., until the front or gate end of the dock is reached whereupon the unit A' is placed in position. With the unit A' in position the gate (which is not shown) is mounted and the dock is completed. It will be noted that when the unit D, for instance, (which is assumed to be the first unit placed against the back unit X) is placed in position, "Tremie" concrete is poured between the intermediate portion 8 of the unit D and the lower portion of the interconnecting portion 56 of the unit X up to the height of the pilings 32 with the baffle 51 confining the concrete between the portion 8 of the unit D and the corresponding portion of the portion 56 of the back unit X. The openings 14 of the portion 8 of the unit D are then opened in the manner above described and the portion 8 is filled with concrete. The closures 22 of the openings 16 in the unit D are then removed and reinforcing rods 42 are inserted through the unit D and the ends of the back unit X. The vertical portions 8 and 10 of the unit D are then filled with concrete and the complementary recesses 40 are filled with the desired sealing material. The process is now again repeated with respect to the remaining units until the last or gate unit A is reached. It will be noted that the gate unit A on its outer side is provided with a pendant wall 64 which serves to retain the concrete at the outer end the same as the baffle 51 does at the bottom of the other intermediate portions 8. Again, if desired, "Tremie" concrete is poured against the outermost wall and against the ledge 66 by way of further anchorage.

In Fig. 4 I have illustrated the assembly of the back unit X, the front or gate unit A' and only one intermediate unit D, it being understood that all the units A, B, C (and others if desired) are interposed between the units X and A' until the desired length is reached.

Again referring to the baffle or partition 52 it is pointed out that in addition to serving as a concrete retainer it also is useful as a balancing device so that if, in the flooding and submerging of a given unit from the position shown at D to the position shown at A, B, C, water should enter at one end faster or in greater quantities than at the other difficulty might be experienced in proper submerging and aligning of the units, but by the use of the partition 52 if any such unbalancing should take place some or all of the openings 14 and 16 at that side of the unit can be closed while some or all of the openings on the other side of the partition are opened thus restoring the balance.

In order to provide for the insertion of the reinforcing rods 42 in the upper portions 10 and 12 it is desirable to place two successive units in position before the concrete is poured into the foremost of said two units so that there always is an unfilled unit A, B, C or D aligned and in position next to the vertical portions 10 and 12 of which are being filled with concrete. This is due to the fact that, as shown in Fig. 3, the rods 42 must project from one unit into the next and of course this must be done before the concrete is poured.

I wish to call special attention to the importance of the preformed back unit X and front unit A the use of which obviates the necessity of building forms under water especially with reference to the unit A' which is provided with the sills 54 for reception of a gate. This not only limits the labor and cost involved but also it greatly conserves the structural steel elements and sheet metal parts which would otherwise have to be used in the building of concrete-retaining forms.

With respect to the units A, B, C, D, etc., and the front end unit A' and the back end unit X, it is emphasized that each of these units is a completely preformed, hollow and closed unit so that each unit can float to the desired location without bulkheading, to close the open sides as would be necessary in prior art constructions, as for instance, that shown in Williams Patent No. 1,526,-446 or his corresponding British Patent No. 171,-172 of 1921. Also when the units of my construction are sunk at the desired location, concrete is poured into a preformed, closed form or mould with or without pumping out the water, as would be the case in prior art constructions, such, for example, as that shown in the Williams patents aforesaid and his Patent No. 1,526,447, in all of which when the dock, be it in one piece or in sections, is sunk, the water must be pumped out before concrete is poured to form the thin bottom 5 of Williams' dock. In my construction, because no thin working floor has to be formed, as in Williams, concrete is poured until the hollow forms are filled. As to docks of the prior art, be they made of one piece or in sections, it is pointed out that they have only one point of buoyancy, namely at the center of gravity, which would be the center of the base. In my construction, the intermediate portion 8 and the end portions 10 and 12 constitute three separate volumes, each having its own center of buoyancy. The three-point buoyancy referred to is the direct result of the U-shaped hollow structure.

A still further advantage of my construction is that the transversely-extending spaces formed between the vertical side walls of adjacent portions 8 of the units A, B, C, etc. constitute forms or moulds into which anchoring concrete is poured to hold the units together and to the foundation. Therefore, once the preformed units are made, and once the foundation is prepared, it is only necessary to sink the units on the foundation and then to pour concrete between and inside of the units to complete the dock installation.

As will be seen from Fig. 1, each of the units is so designed as to float on its side while being towed to the position in which it is to be sunk. This is best exemplified by the unit D. By this construction, it is unnecessary to excavate any deeper than is required for the height of the dock. If each of the units forming my dock were so designed as to float in a vertical position or on its end, it will be necessary to excavate much deeper because units constructed of hollow concrete float substantially submerged. As will be seen from the drawings, the width of the sections 10 is much less than their height or length so that about a fifty per cent saving in excavation is effected by this construction.

Having thus described my invention, what I claim as new and desire to secure by Letters Patent is:

1. A dry dock construction comprising a plurality of foundation strips laid upon and anchored to the ocean floor and extending longitudinally of said dry dock construction, relatively low and relatively high pilings extending upwardly from the ocean floor between said foundation strips, premolded units each comprising vertical end portions and a horizontal section interconnecting the lower portions of said end portions, said horizontal portions of each of said units being narrower than the end portions and resting transversely upon said foundation strips with said piling projecting between adjacent sections and an anchoring mass of concrete engaging said foundation strips, said relatively low and said relatively high pilings and enveloping the vertical sides and bottom of each of said horizontal portions.

2. A dry dock construction comprising a foundation including upstanding piles, a plurality of integrally-formed units each comprising vertical hollow, closed end portions for constituting the side walls of the finished dock and a horizontal hollow, closed portion interconnecting the lower ends of said vertical portions and forming the base and floor of the finished dock, said horizontal portions being adapted to rest on said foundation, means for anchoring said units to each other, and a mass of concrete engaging the lower portions of said units and said foundation, the displacement of each of said units being such that when empty it floats.

3. A dry dock construction comprising a foundation, a plurality of integrally molded hollow, closed units each comprising vertical end portions constituting the side walls of the finished dock and a horizontal portion interconnecting the lower ends of said vertical portions and constituting the base and floor of the finished dock, the displacement of each of said units being such that when empty it floats, means for anchoring said units to each other, and a mass of concrete engaging the lower portions of said units and said foundation, there being normally closed openings in said vertical and horizontal portions of said units through which water may be admitted to flood and submerge said units and through which, after said units are submerged, concrete is poured to fill said hollow units.

4. A dry dock construction comprising a plurality of integral premolded units each comprising vertical end portions constituting the side walls of the finished dock and a horizontal portion interconnecting the lower portions of said vertical portions and constituting the base and floor of the finished dock, a hollow, integral premolded back section comprising a back wall extending the width of said dry dock, integrally formed extensions against which the vertical portions of the first of said units are adapted to abut, a hollow, integral front portion having premolded recesses therein for receiving the gate of said dry dock, and means for anchoring all of said portions to a foundation and to each other, each of said units being in the nature of a closed, hollow structure the displacement of which is such that when empty it floats.

5. The structure recited in claim 2, in which said horizontal portion is narrower than said end portions whereby when two units are placed with their vertical portions abutting, a space is formed between the horizontal portions of said units into which concrete may be poured.

6. The structure recited in claim 2, together with a longitudinally-extending baffle depending from the under side of said horizontal portion and extending close to said foundation to prevent concrete poured along one side of a given unit from passing beneath and to the other side of said unit.

7. The structure recited in claim 2 in which the side walls of said horizontal portion converge upwardly.

8. A dock construction comprising a plurality of integrally formed units each comprising vertical hollow, closed end portions adapted to constitute the side walls of a finished dock when said units are assembled together, and a horizontal hollow, closed portion interconnecting said end portions, said horizontal portions being adapted to form the floor of the dock when said units are assembled together, the structure and displacement of each of said units being such that, when empty, it floats on adjacent vertical sides of said horizontal and end portions.

9. The structure recited in claim 2 together with a partition extending transversely of said horizontal portion to divide the latter into two compartments.

10. The structure recited in claim 2 in which said means includes rods extending horizontally from the walls of said units adapted to be engaged by said mass of concrete.

11. The structure recited in claim 3 in which said means includes rods extending horizontally through the vertical walls of said units adapted to be engaged by concrete poured thereinto.

12. The method of building a sectional dry dock which includes preparing a foundation, prefabricating a plurality of hollow U-shaped units, each of said units including end vertical members and a horizontal member connecting the lower portions of said vertical members and being so designed as to float in a substantially horizontal position on adjacent vertical sides of said horizontal and vertical members, floating one of said units horizontally on its side to a spot over said foundation, righting said unit and sinking it in vertical position until said horizontal member rests on said foundation, floating, righting and sinking another unit, with the vertical members thereof contiguous with the vertical members of the preceding unit but with the horizontal members of said units spaced, pouring concrete into said units and between said horizontal members, and repeating the process until the desired length is attained.

13. The steps recited in claim 12 together with placing a unit at the land side of said dock, completely to close that end of the dock, and placing a unit at the other end of said dock and providing said unit with means for receiving gates for opening and closing said last-mentioned end of said dock.

GERALD H. TUMOLILLO.